(12) United States Patent
Meslin

(10) Patent No.: US 8,602,327 B2
(45) Date of Patent: Dec. 10, 2013

(54) MICROCIRCUIT CARD WITH AN INDICATOR AND METHOD IMPLEMENTED IN SUCH A CARD

(75) Inventor: Jean-Marc Meslin, Deuil la Barre (FR)

(73) Assignee: Oberthur Technologies, Colombes (FR)

( * ) Notice: Subject to any disclaimer, the term of this patent is extended or adjusted under 35 U.S.C. 154(b) by 0 days.

(21) Appl. No.: 13/157,924

(22) Filed: Jun. 10, 2011

(65) Prior Publication Data

US 2011/0303743 A1      Dec. 15, 2011

(30) Foreign Application Priority Data

Jun. 11, 2010   (FR) ...................... 10 54646

(51) Int. Cl.
*G06K 19/06*      (2006.01)

(52) U.S. Cl.
USPC .......................................... 239/492; 235/487

(58) Field of Classification Search
CPC ............................................... G06K 19/07749
USPC ............................................... 235/487, 492
See application file for complete search history.

(56) References Cited

U.S. PATENT DOCUMENTS

| | | | |
|---|---|---|---|
| 4,794,236 A | 12/1988 | Kawana et al. | |
| 6,752,321 B1 | 6/2004 | Leaming | |
| 2005/0092830 A1 | 5/2005 | Blossom | |
| 2008/0179403 A1 | 7/2008 | Endlebardt et al. | |
| 2010/0309105 A1 | 12/2010 | Baldischweiler | |
| 2011/0101109 A1* | 5/2011 | Bona et al. ................. | 235/492 |

FOREIGN PATENT DOCUMENTS

| | | |
|---|---|---|
| KR | 20060092159 A | 8/2006 |
| WO | 03/001433 A1 | 1/2003 |
| WO | 2008094890 A2 | 8/2008 |
| WO | 2009095203 A1 | 8/2009 |

OTHER PUBLICATIONS

French Search Report, dated Feb. 2, 2011, from corresponding French application.

* cited by examiner

*Primary Examiner* — Ahshik Kim
(74) *Attorney, Agent, or Firm* — Young & Thompson

(57) ABSTRACT

A microcircuit card, includes an indicator (140), receiving elements for receiving an item of selection information for selecting an application and elements for commanding the indicator into a first configuration when the item of selection information designates a first application and into a second configuration, distinct from the first configuration, when the item of selection information designates a second application. A method implemented in such a card is also described.

28 Claims, 4 Drawing Sheets

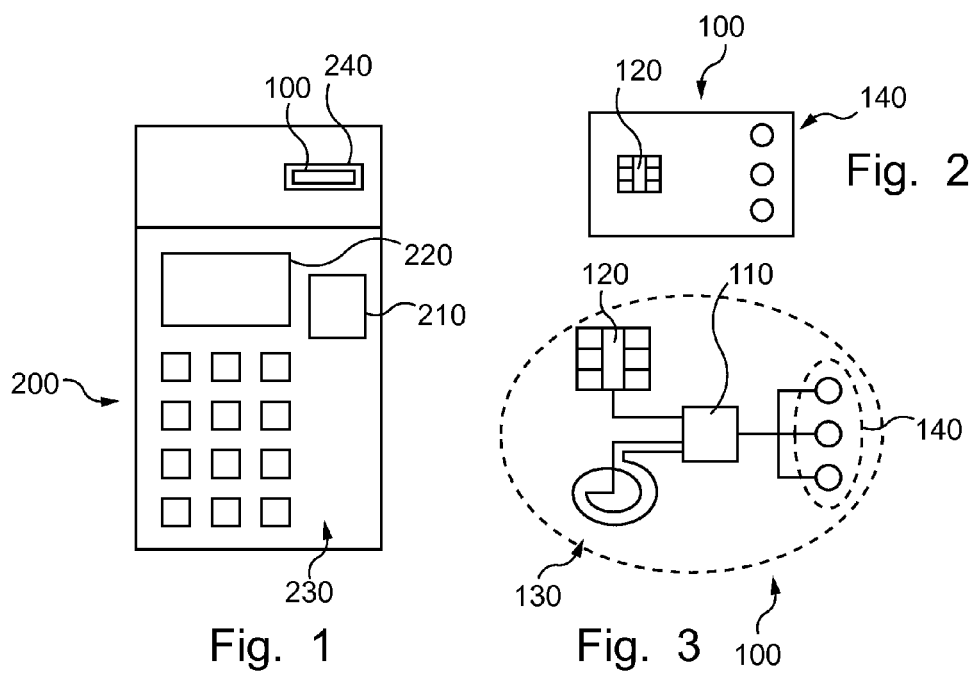

DEBIT : adr VERIFY PIN (DEB)
  adr READ RECORD (DEB)
  adr GENERATE AC (DEB)

VERIFY PIN (DEB) :

READ RECORD (DEB) :

GENERATE AC (DEB) :

CREDIT : adr VERIFY PIN (CRED)
  adr READ RECORD (CRED)
  adr GENERATE AC (CRED)

VERIFY PIN (CRED) :

READ RECORD (CRED) :

GENERATE AC (CRED) :

Fig. 5

DEBIT : adr VERIFY PIN (DEB)
       adr READ RECORD (DEB)
       adr GENERATE AC (DEB)

VERIFY PIN (DEB) : SET CONFIG1

READ RECORD (DEB) :

GENERATE AC (DEB) :

CREDIT : adr VERIFY PIN (CRED)
        adr READ RECORD (CRED)
        adr GENERATE AC (CRED)

VERIFY PIN (CRED) : SET CONFIG2

READ RECORD (CRED) :

GENERATE AC (CRED) :

Fig. 7

MICROCIRCUIT CARD WITH AN INDICATOR AND METHOD IMPLEMENTED IN SUCH A CARD

BACKGROUND OF THE INVENTION

1. Field of the Invention

The invention concerns a microcircuit card and a method implemented in such a card.

2. Description of the Related Art

It is well known to use microcircuit cards as a data carrier which a user can present to be able to exercise rights attributed to the holder of the card.

In this context, the card typically dialogs with a terminal which determines, on the basis of data exchanged with the card (originating with the card or not, as in the case of a code supplied to the terminal by the user), whether the bearer of the card (that is to say the user) is authorized to receive the services concerned.

The same microcircuit card may moreover be used for several applications, that is to say it may contain data which enable the card to authorize different services to the user.

The application used during a given transaction is selected by the terminal (in general further to a choice made by the user, for example on a user interface of the terminal); the card receives an item of selection information from the application concerned and continues its operation within the context of that application.

The possibility of operating according to several applications may however prove to be complex for the user, who anyway frequently has no knowledge of that possibility. For example, when the user has to choose on a screen of the terminal what application he wishes to use, the display is in general succinct and does not always enable the operation of the application concerned to be understood, nor to obtain an insight into the possible consequences, in particular when the terminal displays information in a language that is foreign to that of the bearer of the microcircuit card.

SUMMARY OF THE INVENTION

In this context, the invention provides a microcircuit card, characterized in that it comprises an indicator, receiving means for receiving an item of selection information for selecting an application, and means for commanding the indicator into a first configuration when the item of selection information designates a first application and into a second configuration, distinct from the first configuration, when the item of selection information designates a second application.

The indicator thus enables the carrier of the card to know which application is used, whatever the nature of the terminal and the display the terminal may have to offer.

The receiving means are for example adapted to receive a selection command containing the item of selection information. It may thus be provided for example for the card to comprise exchanging means for exchanging data with a reader (for example an interface with contacts and/or a contactless interface) and for those exchanging means to be adapted to receive that selection command. Such a command, emitted by the terminal, leads to the continuation of the operation of the card within the framework of the application designated by the item of selection information.

In this context, the reception means for example form part of the exchanging means.

According to a first example embodiment, the command means are adapted to command the indicator into the first or the second configuration according to the item of selection information. It is then for example a microprocessor of the card which directly commands the indicator into the configuration associated with the application.

According to a second example embodiment, means for implementing the first application (for example a debiting application) are adapted to command the indicator into the first configuration and means for implementing the second application (for example a crediting application) are adapted to command the indicator into the second configuration.

In this case the configuration is commanded during the execution of the application concerned.

The indicator is for example a light-emitting indicator.

In this case, the light-emitting indicator may comprise a first and a second light source; in the first configuration, it may then be provided for the first light source to be active and for the second light source to be inactive, whereas, in the second configuration, the first light source is inactive and the second light source is active.

The light sources are for example light-emitting diodes.

The indicator is typically situated on the same face of the card as that bearing at least one electrical contact, but on the opposite side of that face relative thereto.

The invention also provides a method implemented in a microcircuit card, characterized in that it comprises the following steps:

receiving an item of selection information for selecting an application;

commanding an indicator into a first configuration when the item of selection information designates a first application and into a second configuration, distinct from the first configuration, when the item of selection information designates a second application.

The receiving step is for example carried out by receiving a selection command containing the item of selection information.

The selection command may then be received by (that is to say via) the exchanging means of the card already referred to.

According to a first embodiment, the command of the indicator into the first or the second configuration is carried out according to the item of selection information.

According to a second embodiment, the indicator is commanded into the first configuration during the implementation of the first application and the indicator is commanded into the second configuration during the implementation of the second application.

More generally, an electronic entity is provided, for example a pocket or portable electronic entity, characterized in that it comprises:

an indicator;

receiving means for receiving an item of selection information for selecting an application;

commanding means for commanding the indicator into a first configuration when the item of selection information designates a first application and into a second configuration, distinct from the first configuration, when the item of selection information designates a second application.

This method and this electronic entity have the advantages stated above for the card and may be given the optional features stated above for the card.

The selection command referred to earlier is for example an APDU SELECT command in accordance with the ISO 7816 standard.

BRIEF DESCRIPTION OF THE DRAWING FIGURES

Other features and advantages of the invention will appear in the light of the following description, made with reference to the accompanying drawings in which:

FIG. 1 represents a system comprising a terminal receiving a microcircuit card;

FIG. 2 shows the microcircuit card of FIG. 1 viewed from above;

Figure 6:
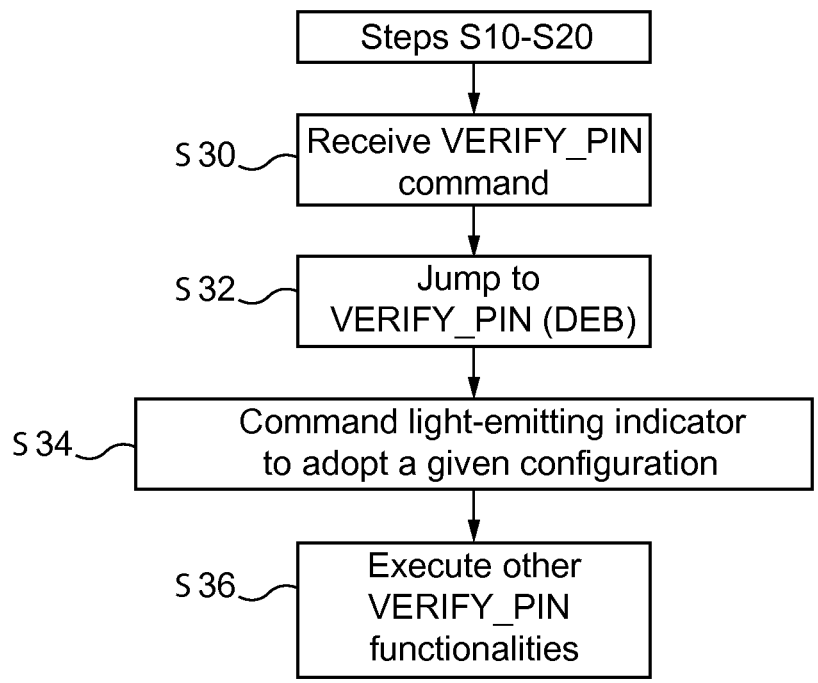

FIG. 3 describes the main components constituting the microcircuit card of FIG. 2;

FIG. 4 represents an example of a method implemented within the microcircuit card of FIGS. 2 and 3 in accordance with the teachings of the invention;

FIG. 5 represents an example of organization of a memory of the microcircuit card;

FIG. 6 represents another example of a method which may be implemented within a microcircuit card in accordance with the teachings of the invention;

FIG. 7 represents an example of organization of a memory within the framework of the method represented in FIG. 6.

DETAILED DESCRIPTION OF THE INVENTION

FIG. 1 illustrates a typical example of a context in which the invention is implemented.

A terminal 200 comprises a user interface formed from a keyboard 230 and a screen 220.

The operation of the terminal 200 is driven by a microcontroller 210 (typically comprising a microprocessor and memories used by the microprocessor) which is connected (in a manner not shown) to the keyboard 230, to the screen 220, as well as to a microcircuit card reader 240.

In FIG. 1 a microcircuit card 100 (of the type described below with reference to FIGS. 2 and 3) is represented, inserted into the reader 240.

As can be seen in FIG. 2, the microcircuit card 100 comprises an electrical contact interface (or pad area) 120 adapted to cooperate with electrical connection elements of the card reader 240 in order to enable exchanges of data between the terminal 200 (in particular the microcontroller 210) and the card 100 (in particular its microcontroller 110 described later).

On its upper face (that is to say its face bearing the contact interface 120 already referred to), the microcircuit card 100 furthermore has a light-emitting indicator, here formed from three light-emitting diodes (or LEDs) 140.

In the embodiment described here, the three light-emitting diodes 140 are aligned along an opposite edge of the card 100 to the edge neighboring the contact interface 120. (The edge at which the light-emitting device 140 is situated and the edge neighboring the contact interface 120 are on the small sides of the rectangle formed by the microcircuit card 100 projected into the plane of its upper face already referred to.)

In a slot provided for that purpose, the card reader 240 receives part only of the card 100 inserted into that reader (the part bearing the contact interface 120 which then comes into cooperation with the connection elements of the reader 240 as already stated) such that the light-emitting indicator 140 remains outside the reader 240, and is thus visible to the user.

It is noted that what is described here is a system in which the microcircuit card 100 and the terminal 200 interact by use of contacts, for example in accordance with the ISO7816 standard. As a variant it could be provided for the microcircuit card 100 and for the terminal 200 to interact by means of a contactless interface (in particular that presented in FIG. 3 and described below in the microcircuit card 100).

Similarly, the example embodiment described here uses a light-emitting indicator, but as a variant an acoustic indicator could be used.

The main components for the electrical operation of the microcircuit card 100 are represented in FIG. 3.

The contact interface 120 already described is linked to a microcontroller 110 formed by a microprocessor, a read only memory (or ROM), and a re-writable memory (typically an EEPROM).

The microcircuit card may as already stated include a contactless interface 130, comprising in particular an antenna, and which is linked in this case to the microcontroller 110.

The microcircuit card 100 lastly comprises the light-emitting indicator 140 already referred to; this light-emitting indicator 140 is linked to the microcontroller 110 such that the microprocessor of the microcontroller 110 may command the switching on or off of the different diodes forming the indicator (and thus the emission or not of light by each of the diodes) in several configurations.

The light-emitting indicator 140 is powered (when the microcontroller 110 commands its switching on) by means of the power supplied to the card by the terminal (either by the contact interface 120, or by the contactless interface 130) as explained later.

FIG. 4 represents a first example of a method implemented within the microcircuit card 100 when it is inserted into the reader 240 and in accordance with the teachings of the invention.

The insertion of the card 100 in the reader 240 first of all enables the components of the microcircuit card 100 to be powered, and in particular the microcontroller 110 (step S10). To be precise, the microcircuit card 100 described here has no internal power supply and its electrical components are powered only after connection to the terminal 240.

It is noted that the variant in which the communication between the terminal 200 and the microcircuit card 100 is made without contacts, by means of the contactless interface 130, the microcircuit card 100 is remotely supplied by the terminal 200 (which then serves as reader).

After being provided with power, the microcircuit card 100 is initialized and (in order to signal its presence and its correct operation) sends a predetermined initial message, generally known by the name "Answer To Reset" or ATR (step S12).

When it receives this initial message from the microcircuit card 100, the terminal 200 (that is to say principally its microcontroller 210 via the reader 240) sends a request intended for the card for the purpose of receiving a list of the applications available on that card ("Get Processing Options" command).

At step S14 the microcircuit card 100 (that is to say its microcontroller 110) receives that request and replies to it by sending, at step S16, a list of the available applications to the terminal 200.

This list is formed from standardized identifiers (which are thus predetermined) for the different applications available on the card. Such identifiers are for example the commonly used AIDs (AID meaning "Application Identifier").

The terminal 200 receives the list of the applications available on the card (that is to say the list of the AIDs).

According to a possible example embodiment, the terminal 200 then displays on its screen 220 a list of possibilities each corresponding to an application available on the card, in accordance with what is indicated on the list of applications received from the card 100.

The user may thus select what application he wishes to use using the keyboard 230.

According to another possible example embodiment, the terminal makes the choice of the application to use without asking the user. This may be the case in particular when, of the available applications as listed in the list received from the microcircuit card 100, only one application can be implemented by the terminal concerned. The choice of this application is then automatically made.

In all cases, the terminal 200 then sends a command for selection of the application chosen (either by the user, or automatically by the terminal 200). This selection command is for example a "Select" command.

At step S18 the microcircuit card 100 thus receives a command for selecting an application identified by the AID contained in that selection command.

At step S20 the microcontroller 110 then proceeds with the interpretation of that selection command and, for example in the random access memory of the microcontroller 110, stores the identified application, that is to say the one selected at the terminal.

This storage in memory is for example carried out by writing, at a given address of the re-writable memory, the address (DEB or CRED in the example described here) from which the instructions for implementation of the application concerned are stored in read only memory (or, as a variant, in the re-writable memory).

Thus, depending for example whether the chosen application is a debit application or a credit application, the microcontroller 110 will command the writing to re-writable memory either of the address DEBIT, or of the address CREDIT, at which are respectively located, as shown in FIG. 5, the instructions necessary for the execution of the various commands (for example VERIFY PIN, READ RECORD, GENERATE AC) that may be implemented during the operation of the application concerned.

The microcircuit 110 furthermore commands the light-emitting indicator 140 to adopt a configuration associated with the identified application (step S22). For example, the microcircuit 110 commands the switching on of a green light-emitting diode when the selected application (identified by the AID) is a debit application (the other diodes then being off) and switches on a blue light-emitting diode if the selected application is a credit application (the other diodes then being off).

It is to be noted that the colors of the light-emitting diodes which have just been indicated may be obtained by adding a colored filter to the diode concerned.

It may be provided for the microcontroller 110 to command the indicator 140 as described above in accordance with an item of information stored in re-writable memory and associating the application and the desired configuration of the indicator for that application. This information may be written in the memory on customization of the microcircuit card.

The data exchanges between the terminal 200 and the microcircuit card 100 next continue with the sending of commands from the terminal 200 to the microcircuit card 100.

For example, the microcircuit card 100 receives a VERIFY PIN command at step S24. From the re-writable memory the microcircuit of the microcontroller 110 then reads the address stored previously (for example DEBIT), then, at that address DEBIT, reads the address VERIFY PIN (DEB) at which are located the instructions for implementation of the VERIFY PIN command in the context of the debit application, and lastly gives rise to a jump to that latter address VERIFY PIN (DEB) in order to implement those instructions (step S26).

It can be seen that the activation of the indicator 140 in a configuration associated with the selected application enables the user to continuously have feedback on the application actually used and for example to stop the transaction if an undesired application is used by the terminal 200.

It may furthermore be provided for the microcircuit card to have markings in the vicinity of each light-emitting diode to give the meaning of the switching on of the light-emitting diode situated in the immediate neighborhood of the marking concerned.

FIG. 6 represents the steps of a second example of a method which may be implemented within a microcircuit card 100 in accordance with the teachings of the invention.

This method commences with steps S10 to S20 which are identical to those described earlier with reference to FIG. 4 and which will not therefore be described again.

It will be noted on the other hand that the method of FIG. 6 does not include step S22 of commanding the light-emitting indicator according to the application identified.

The process of FIG. 6 thus continues after step S20 with the reception of a command from the terminal 200, for example the command VERIFY PIN (step S30).

As in the case of FIG. 4, the microcontroller 110 reads the address of the application selected earlier, for example the address DEB.

At this address DEB (here in read only memory) the microcontroller 110 reads the address VERIFY PIN (DEB) at which are stored the instructions relative to the command VERIFY PIN in the context of the debit application.

The microcontroller 110 then jumps to that last address, that is to say that it executes the listed instructions from that VERIFY PIN (DEB) address at step S32.

As can be seen in FIG. 7, these instructions comprise in particular instructions for commanding the light-emitting indicator 140 into a given configuration (named CONFIG1 in FIG. 7) at step S34.

The microcontroller 110 then continues the execution of other instructions stored from the address VERIFY PIN (DEB) in order to implement the other functionalities of that command, in particular in this case the verification of the personal identification number (or PIN) associated with the user.

As can be seen in FIG. 7, it is provided for the instructions for commanding the light-emitting indicator into another configuration (configuration CONFIG2 in FIG. 7) to be inserted within instructions relative to at least one command for implementation in the context of another application (here a credit application).

Thus, on account of the execution of the command concerned, the light-emitting indicator has a configuration which depends on the application in the context of which the command is implemented, which enables the user to know what application is used as in the context of the first example described with reference to FIG. 4.

As for the first embodiment, it may be provided for the microcontroller 110 to command the indicator 140 as described above in accordance with an item of information stored in re-writable memory and associating the application and the desired configuration of the indicator for that application. This information may be written in the memory on customization of the microcircuit card.

The preceding examples are simply possible embodiments of the invention.

The invention claimed is:

1. A microcircuit card, comprising:
a memory storing first instructions executable for implementing at least one first command in a context of a first application and second instructions executable for implementing at least one second command in a context of a second application;

an indicator;
- means for receiving an item of selection information for selecting an application among the first application and the second application, the means for receiving being adapted to receive a selection command containing the item of selection information;
- means for commanding the indicator into a first configuration when the item of selection information designates the first application and into a second configuration, distinct from the first configuration, when the item of selection information designates the second application,
- wherein the microcircuit card is configured to operate in accordance with the first application by executing the first command or in accordance with the second application by executing the second command.

2. The microcircuit card according to claim 1, further comprising means for exchanging data with a reader that is adapted to receive a selection command containing the item of selection data.

3. The microcircuit card according to claim 1, wherein the means for commanding are adapted to command the indicator into the first or the second configuration according to the item of selection information.

4. The microcircuit card according to claim 1, wherein means for implementing the first application are adapted to command the indicator into the first configuration and wherein means for implementing the second application are adapted to command the indicator into the second configuration.

5. The microcircuit card according to claim 1, wherein the indicator is a light-emitting indicator.

6. The microcircuit card according to claim 5, wherein the light-emitting indicator comprises a first and a second light source, wherein, in the first configuration, the first light source is active and the second light source is inactive, and wherein, in the second configuration, the first light source is inactive and the second light source is active.

7. The microcircuit card according to claim 6, wherein the light sources are light-emitting diodes.

8. The microcircuit card according to claim 1, wherein the indicator is situated on a face of the card, on an opposite side of said face relative to at least one electrical contact of the card.

9. The microcircuit card according to claim 1, wherein the command means are adapted to command the indicator into the first or the second configuration according to the item of selection information.

10. The microcircuit card according to claim 1, wherein means for implementing the first application are adapted to command the indicator into the first configuration and wherein means for implementing the second application are adapted to command the indicator into the second configuration.

11. The microcircuit card according to claim 1, wherein the indicator is an acoustic indicator.

12. The microcircuit card according to claim 1, wherein the means for commanding is an application protocol data unit in accordance with an ISO 7816 standard.

13. The microcircuit card according to claim 1, wherein the first executable application is a debit application and the second executable application is a credit application.

14. A method implemented in a microcircuit card, comprising:
- storing in a memory first instructions executable for implementing at least one first command in a context of a first application and second instructions executable for implementing at least one second command in a context of a second application;
- receiving an item of selection information for selecting an application among the first application and the second application, the receiving being carried out by receiving a selection command containing the item of selection information;
- commanding an indicator into a first configuration when the item of selection information designates the first application by executing the first command and into a second configuration, distinct from the first configuration, when the item of selection information designates the second application by executing the second command; and
- operating the microcircuit card in accordance with the selected application.

15. The method according to claim 14, wherein the card comprises means for exchanging data with a reader and wherein the selection command is received by said means for exchanging.

16. The method according to claim 14, wherein the command of the indicator into the first or the second configuration is carried out according to the item of selection information.

17. The method according to claim 14, wherein the indicator is commanded into the first configuration during the implementation of the first application and the indicator is commanded into the second configuration during the implementation of the second application.

18. The method according to claim 15, wherein the command of the indicator into the first or the second configuration is carried out according to the item of selection information.

19. The method according to claim 15, wherein the indicator is commanded into the first configuration during the implementation of the first application and the indicator is commanded into the second configuration during the implementation of the second application.

20. The method according to claim 15, wherein the command of the indicator into the first or the second configuration is carried out according to the item of selection information.

21. The method according to claim 15, wherein the indicator is commanded into the first configuration during the implementation of the first application and the indicator is commanded into the second configuration during the implementation of the second application.

22. The method according to claim 14, wherein the indicator is an acoustic indicator.

23. The method according to claim 14, wherein the command is an application protocol data unit command in accordance with an ISO 7816 standard.

24. The method according to claim 14, wherein the first executable application is a debit application and the second executable application is a credit application.

25. A microcircuit card, comprising:
- a memory storing first instructions executable for implementing at least one first command in a context of a first application and second instructions executable for implementing at least one second command in a context of a second application;
- an indicator;
- a contact interface configured for receiving an item of selection information for selecting an application among the first application and the second application, the contact interface being adapted to receive a selection command containing the item of selection information;
- a microcontroller configured for commanding the indicator into a first configuration when the item of selection information designates the first application and into a second configuration, distinct from the first configuration, when the item of selection information designates the second application, wherein the microcircuit card is configured to operate in accordance with the first application by executing the first command or in accordance with the second application by executing the second command.

26. The microcircuit card according to claim 25, wherein the indicator is a light-emitting indicator or an acoustic indicator.

27. The microcircuit card according to claim 25, wherein the means for commanding is an application protocol data unit in accordance with an ISO 7816 standard.

28. The microcircuit card according to claim 25, wherein the first executable application is a debit application and the second executable application is a credit application.

* * * * *